United States Patent [19]

Kawabata et al.

[11] Patent Number: 5,166,579
[45] Date of Patent: Nov. 24, 1992

[54] DISCHARGE LAMP OPERATING CIRCUIT

[75] Inventors: Kenji Kawabata, Ome; Ikuya Nomoto, Akigawa, both of Japan

[73] Assignee: Hitachi, Ltd., Tokyo, Japan

[21] Appl. No.: 554,891

[22] Filed: Jul. 20, 1990

[30] Foreign Application Priority Data

Jul. 24, 1989 [JP] Japan .................. 1-188899

[51] Int. Cl.$^5$ .................. H05B 37/02; H05B 41/36
[52] U.S. Cl. .................. 315/209 R; 315/219; 315/DIG. 5; 315/DIG. 7; 331/110; 363/17; 363/132
[58] Field of Search ............ 315/209 R, 219, DIG. 5, 315/DIG. 7; 331/110; 363/17, 131, 132

[56] References Cited

U.S. PATENT DOCUMENTS

| | | | |
|---|---|---|---|
| 4,105,957 | 8/1978 | Cathell | 331/110 |
| 4,459,516 | 7/1984 | Zelina et al. | 315/209 R |
| 4,688,165 | 8/1987 | Pruitt | 363/132 |
| 4,734,624 | 3/1988 | Nagase et al. | 315/209 R |
| 4,757,432 | 7/1988 | Hancock | 363/17 |
| 4,876,635 | 10/1989 | Park et al. | 363/17 |
| 4,920,300 | 8/1990 | Scott | 315/DIG. 5 |
| 4,949,016 | 8/1990 | De Bijl et al. | 315/DIG. 7 |

FOREIGN PATENT DOCUMENTS 63-81795 12/1988 Japan .

Primary Examiner—Eugene R. LaRoche
Assistant Examiner—Son Dinh
Attorney, Agent, or Firm—Fay, Sharpe, Beall, Fagan, Minnich & McKee

[57] ABSTRACT

The discharge lamp operating circuit comprises two series circuits, each including two switching devices, connected in parallel with the power supply, a series circuit, including a choke coil, a first capacitor, and a parallel circuit with a discharge lamp and a second capacitor, and connected between the middle points of the one and the other series circuit, reverse-direction rectifiers connected in parallel with the corresponding switching devices, said discharge lamp operating circuit turning on and off said discharge lamp by turning on and off the switching devices alternately. In this discharge lamp operating circuit, the timing of switching the switching devices is set from the closed condition to the open condition at a time when the current flowing through the switching devices is almost at zero level.

8 Claims, 4 Drawing Sheets

FIG. 8
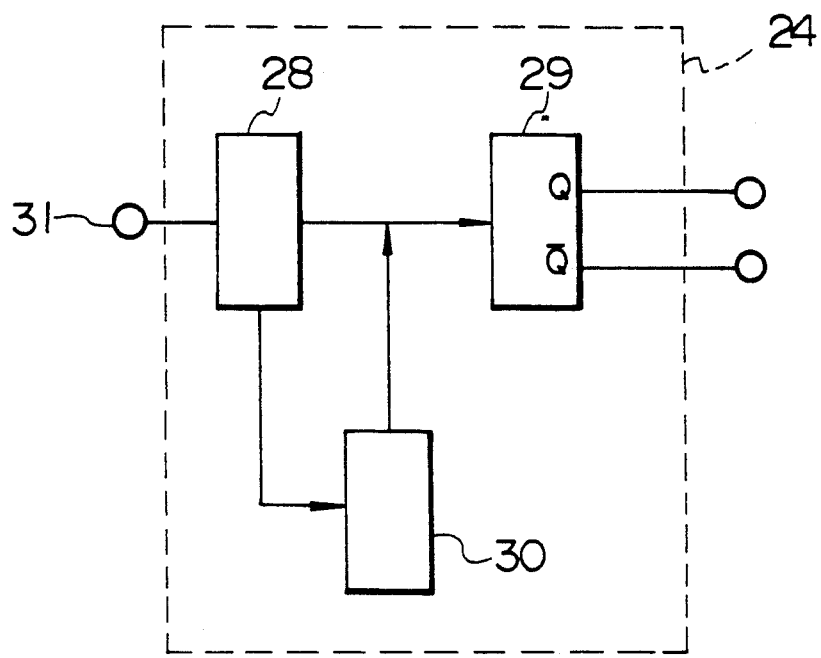
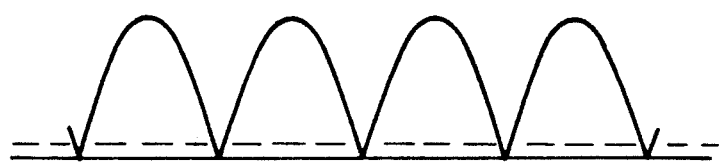
FIG. 9A
FIG. 9B
FIG. 9C
FIG. 9D

DISCHARGE LAMP OPERATING CIRCUIT

BACKGROUND OF THE INVENTION

This invention relates to a discharge lamp operating circuit featuring decreased power loss of a switching device.

As described in JP-A-63-81795, the conventional discharge lamp operating circuit is constructed such that a capacitor and a discharge lamp are connected between the middle points of two series circuits connected in parallel with the power supply, each series circuit including two switching devices, and the discharge lamp is lit by turning on and off the switching devices alternately.

In the above-mentioned prior art, since a high voltage applied to set into operation the discharge lamp is applied also to the switching devices, the switching devices need to have a breakdown voltage higher than the high starting voltage mentioned above. The waveform of the current flowing through the switching devices and that of the voltage applied to the switching devices come to be close to rectangular, resulting in great power dissipation and increased cost unless MOSFETs are used which have high switching speed. Conversely, if the switching speed is increased, noise will become large, creating the possibility of noise interfering with the operation of other devices. With the prior art, the output voltage is about twice the supply voltage at the largest, and the prior art cannot be used in cases where the supply voltage is low.

SUMMARY OF THE INVENTION

An object of this invention is to provide a discharge lamp in which the switching devices require lower voltage, consume less power, and produce reduced noise. Another object of this invention is to provide a discharge lamp which can be applied to applications in which the supply voltage is low and which is capable of dimming with low power loss maintained.

The first one of the above objects can be achieved by connecting a series circuit of a choke coil and a capacitor in series with the discharge lamp, and by synchronizing the L-C series resonant period with the ON/OFF periods of the switching devices.

The other of the above objects can be achieved by using the primary winding of a transformer as an inductance for the L-C series resonant circuit, connecting a discharge lamp to the stepped-up secondary winding, and performing dimming by turning on and off the switching devices at shorter periods than the resonant periods of said series circuit including the choke coil, capacitor and discharge lamp. Dimming with low power loss can be performed by connecting a capacitor in parallel with each switching device.

BRIEF DESCRIPTION OF THE DRAWINGS

FIG. 6A is a diagram showing a current waveform;

FIG. 6B is a diagram showing a voltage waveform;

FIG. 6C is a diagram showing the ON and OFF states of a switch;

FIG. 8 is a circuit diagram of a switch control circuit; and

FIGS. 9A to 9D are waveforms for explaining the operation of the switch control circuit of FIG. 8.

DESCRIPTION OF THE PREFERRED EMBODIMENTS

First, the principle of this invention will be described.

If an L-C series resonant circuit is connected in series with a discharge lamp, the waveform of the current flowing through the switching devices increases gradually once the current starts flowing, and describes arcs in a sine waveform repeatedly coming down to a zero level. Therefore, by opening the switching devices at the moment the wave of the current goes to a zero level, the power dissipation in switching operations can be reduced substantially. In such an arraignment, the high voltage applied to the discharge lamp is produced in the L-C resonant circuit and is not applied to the switching devices. Therefore, the switching devices have only to have a low breakdown voltage. If a transformer is used in place of the choke coil and the discharge lamp is connected to the secondary side of the transformer, an improved step-up effect can be obtained. Such an embodiment of this invention can be applied when a supply voltage is low.

When dimming is done by changing the frequency of the current, fi a frequency higher than the L-C resonant frequency is used, an abnormal peak current is prevented from occurring. In addition, by connecting a capacitor in parallel with each switching device, a change in voltage across the switching devices is delayed, so that dimming can be achieved with low power loss maintained.

Figure 1:
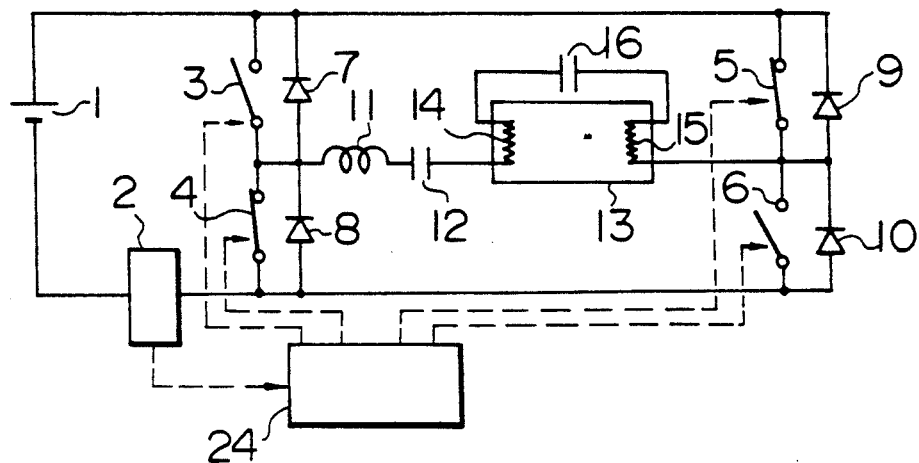
FIG. 1 is a circuit diagram showing a first embodiment of the discharge lamp operating circuit according to this invention.

With reference to the accompanying drawings, embodiments of this invention will now be described. FIG. 1 is a circuit diagram showing a first embodiment of the discharge lamp operating circuit according to this invention.

In FIG. 1, the circuit comprises a DC power supply 1, a current detection circuit 2, switching devices 3 to 6, the ON/OFF operation of which are controlled by the output from a switch control circuit 24, rectifiers 7 to 10, a choke coil 11, a capacitor 12, a discharge lamp 13 having filaments 14 and 15, and a preheat capacitor 16.

Figure 3:
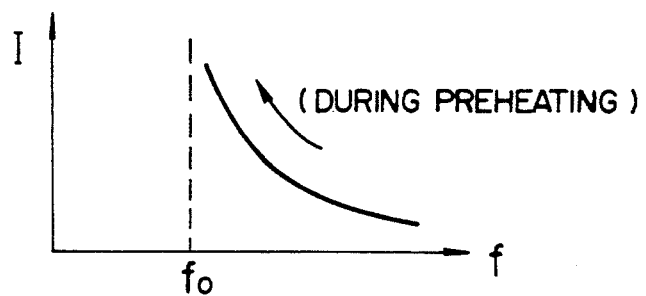
FIG. 3 is a diagram for explaining the operation of the first embodiment.

The operation of the first embodiment will be described. The filaments 14 and 15 are preheated, and the switching devices 3, 6 and the switching devices 4, 5 are turned on and off alternately with regular periods. The ON/OFF periods are set at a value substantially higher than the resonance frequency $f_0$ based on an inductance of the choke coil 11 and a combined capacitance of the capacitor 12 and the preheat capacitor 16. The current flows alternately either through one route of DC power supply 1→switching device 3→choke coil 11→capacitor 12→filament 14→preheat capacitor 16→filament 15→switching device 6→current detection circuit 2→DC power supply 1 or through the other route of DC power supply 1→switching device 5→filament 15→preheat capacitor 16→filament 14→capacitor 12→choke coil 11→switching device 4→current detection circuit 1→DC power supply 2. By this process, the filaments 14, 15 are preheated. Then, if the ON/OFF period of the switching devices is decreased, as the current flowing in the circuit, (that is, the current flowing through the preheat capacitor 16) approaches the resonance frequency $f_0$ as shown in FIG. 3, the voltage applied across the discharge lamp 13 rises. After the discharge lamp 13 is set into operation, the discharge lamp is kept lit at the resonance frequency based on the choke coil 11 and capacitor 12. The zero cross points of the current waveform are detected by the current detection circuit 2.

Figure 2A:
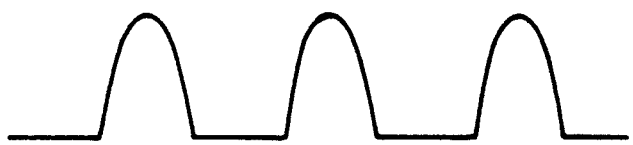
FIGS. 2A and 2B are waveforms of the first embodiment.
Figure 2B:
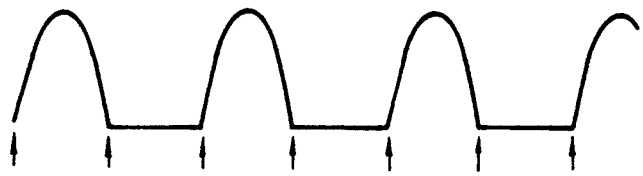

FIGS. 2A and 2B respectively show the waveforms of the current flowing through the switching devices 4, 6 while the lamp stays on. The sum of the waveforms of FIGS. 2A and 2B flows through the current detection circuit 2. By arranging to have the switching devices turn on and off at the zero cross points of the current waveform, as indicated by the arrows in FIG. 2B, the switching power loss can be reduced substantially.

Figure 6C:
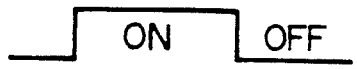
FIGS. 6A to 6C shows waveforms of a case in which capacitors are added to the third embodiment.
Figures 6A, 6B, 7:
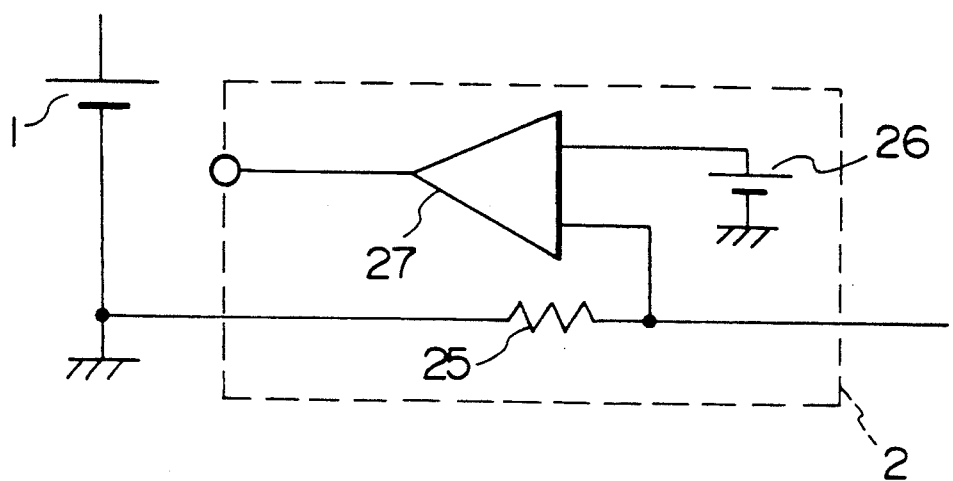
FIG. 7 is a circuit diagram of a current detector.

As embodied examples, FIGS. 7 and 8 show a current detection circuit 2 and a switch control circuit 24, respectively. In FIG. 7, the region indicated by the broken line is the current detection circuit 2, which comprises a current-sensing resistor 25, a reference power supply 26, and a voltage comparator 27. The same reference numerals as in FIG. 1 denote the same or equivalent parts.

The combined current of FIGS. 2A and 2B flows through the current-sensing resistor 25, thus producing a potential difference proportional to this current. The voltage comparator 27 compares the potential difference across the current-sensing resistor 25 with the voltage of the reference voltage source 26. If suitable values are preset for the resistance of the current-sensing resistor 25 and the voltage of the reference voltage source 26, the voltage comparator 27 outputs different levels of voltage when a current above a certain current value is flowing and when a current below a certain current value is flowing.

Referring to an example of the switch control circuit 24 in FIG. 8, the switch control circuit 24 comprises an input terminal 31, a waveform shaping circuit 28, a frequency divider 29, and a timer circuit 30. With reference to the circuit diagram of FIG. 7 and the waveform diagrams of FIGS. 9A to 9D, the operation of the switch control circuit 24 will be described briefly. The input terminal 31 has a voltage such as that shown in FIG. 9B applied which is output as a result of a comparison made between the waveform of the voltage across the current-sensing resistor 25 indicated by the solid line and the waveform of the voltage of the reference voltage source 26 indicated by the broken line in FIG. 9A. This voltage is passed through the waveform shaping circuit 28 to prevent malfunctioning due to noise. Its frequency is divided by the frequency divider 29, and the Q output is input into, for example, the switching devices 3, 6 and the $\overline{Q}$ output into the switching devices 4, 5. Thus, the operation mentioned above can be realized. Dimming is achieved when necessary by outputting a pulse from the timer circuit after passage of a certain time (before a pulse arrives from the output of the current-sensing circuit 2) from the waveform shaping circuit 28.

Referring to FIG. 1, supposing that the choke coil 11 is 2.5 mH, the capacitor 12 is 3900 pF, and the preheat capacitor 16 is 4700 pF, the resonance frequency $f_0$ is 69 kHz, which is based on the inductance of the choke coil 11 and the combined capacitance of the capacitor 12 and the preheat capacitor 16. As the frequency is decreased gradually from 100 kHz, the discharge lamp is lit at about 75 kHz. After the lamp is lit, the lamp current is greatest at about 50 kHz. When the full-wave-rectified normal-frequency voltage of 100 V is used for the power supply and a 40-W circle fluorescent lamp is used for the discharge lamp, the lamp current is 0.35A. By increasing the frequency to 70 kHz, the lamp current is decreased to 0.2A, by which the dimming effect is confirmed. In this dimming operation, 560-pF capacitors are preferably used for the capacitors 20 to 23.

Figure 4:
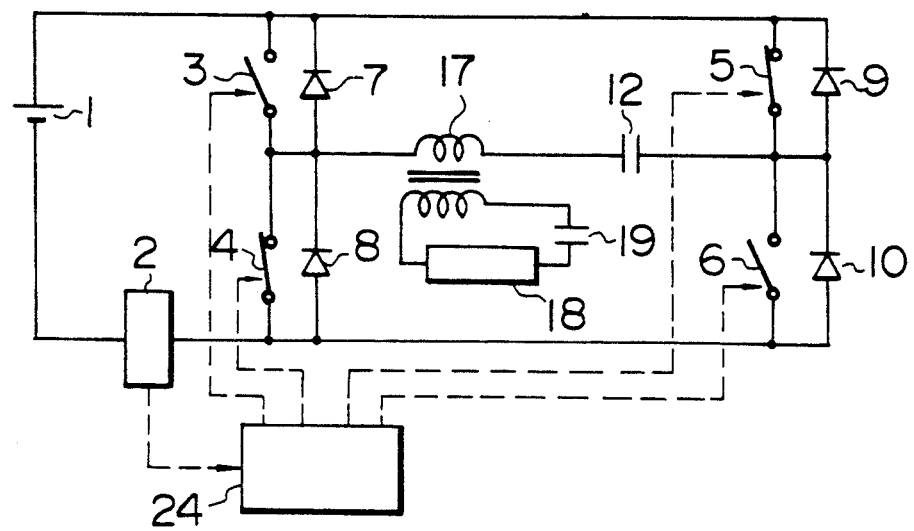
FIG. 4 is a circuit diagram showing a second embodiment of this invention.

With reference to FIG. 4, a second embodiment of this invention will be described. The reference numeral 17 denotes a transformer, 18 denotes a discharge lamp, and 19 denotes a ballast capacitor. The same numerals as in the first embodiment of FIG. 1 denote the same or equivalent parts. The operation of the second embodiment is substantially the same as that of the first embodiment, with the only differences being that the frequency for preheat is set at a value substantially higher than the resonance frequency based on the primary-side inductance of the transformer 17 and the capacitance of the capacitor 12, and that while the lamp is lit, the ON/OFF periods are set at substantially the resonance frequency based on the primary-side inductance of the transformer 17, the capacitance of the capacitor 12, and the equivalent capacitance, reduced to the primary side, of the ballast capacitor 19. The circuit of the second embodiment can be used when the voltage of the DC power supply is far lower than the starting voltage of the discharge lamp 18 or a voltage applied across the discharge lamp 18, as in a case where dry cells are used.

Figure 5:
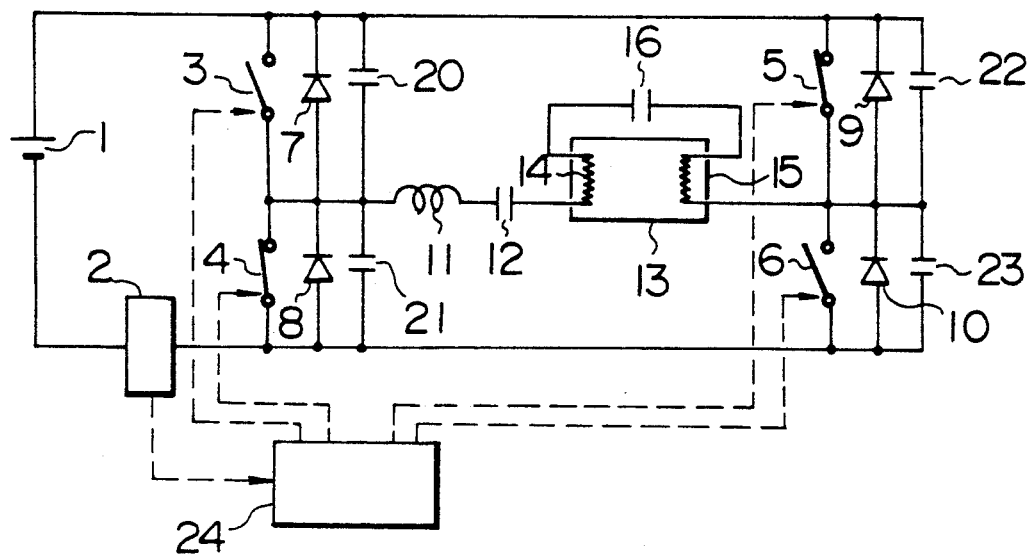
FIG. 5 is a circuit diagram showing a third embodiment of this invention.

The circuits of the first and second embodiments are capable of dimming by frequency control, but in dimming operation, the switching devices are turned on and off at points away from the zero cross points of the current waveform, thus resulting in great switching power loss. A countermeasure for this is incorporated in a third embodiment which is shown in FIG. 5. In FIG. 5, the numerals 20 to 23 denote capacitors, and the same numerals as in the first embodiment denote the same or equivalent parts. By addition of the capacitors 20 to 23, the slopes of the waveform of the voltage across the switching devices become gentle as shown in FIG. 6B. Therefore, even if the switching devices are turned on and off as shown in FIG. 6C during a period in which the current is still flowing as shown in FIG. 6A, the switching power loss does not increase.

As described above, the discharge lamp operating circuit according to this invention comprises two series circuits, each including two switching devices connected in parallel with the power supply; a series circuit, including a choke coil, a first capacitor, and a parallel circuit with a discharge lamp and a second capacitor, connected between the middle points of the first two series circuit; and reverse-direction rectifiers connected in parallel with the corresponding switching devices, said discharge lamp operating circuit turning on and off said discharge lamp by turning on and off the switching devices alternately. In this discharge lamp operating circuit, there is provided means for setting the timing of switching the switching devices from the closed condition to the open condition at a time when the current flowing through the switching devices is almost at zero level. Consequently, the switching power loss of the switching devices is reduced, so that it is possible to provide a discharge lamp operating circuit featuring high reliability and high efficiency. This discharge lamp operating circuit permits the use of switching devices of slow switching speed, such as ordinary bipolar transistors, so that this discharge lamp operating circuit makes for reductions in size and production cost. Furthermore, even if a low-voltage power supply such as a dry cell is used, the voltage can be raised by L-C resonance, and therefore, in case a transformer is needed, it has only to have a smaller turn ratio, which facilitates the reduction in size of the product.

What is claimed is:

1. A discharge lamp operating apparatus, comprising:
   first and second switches connected in series at a first node;
   third and fourth switches connected in series at a second node, and in parallel with said series-connected first and second switches, wherein said first and fourth switches define a first switch group and said second and third switches define a second switch group;
   power supply means for providing electrical power to said first, second, third and fourth switches;
   a discharge lamp having first and second electrodes, wherein said first electrode is electrically connected to said first node, and said second electrode is electrically connected to said second node through an inductor and a first capacitor, said first and second electrodes being arranged to provide one of a preheating current and discharge current for said discharge lamp; and
   current detecting means for detecting when an absolute value of an alternating current flowing through at least one of said first, second, third and fourth switches reaches a substantially zero-crossing point and, responsive to such a detection, for closing one of said first switch group and said second switch group and for opening the other of said first switch group and said second switch group.

2. A discharge lamp operating apparatus according to claim 1, further comprising first, second, third and fourth rectifiers respectively connected in parallel with each of said first, second, third and fourth switches.

3. A discharge lamp operating apparatus according to claim 1, further comprising second, third, fourth and fifth capacitors respectively connected in parallel with said first, second, third and fourth switches.

4. A discharge lamp according to claim 1, further comprising a second capacitor connected between said first and second electrodes so that said second capacitor is connected in parallel with said discharge tube.

5. A discharge lamp according to claim 1, further comprising means for varying switching frequencies of said first and second switch groups during preheating of said discharge lamp such that values of the switching frequencies approach a value of a resonance frequency of a combined capacitance of said inductor and said first capacitor from values higher than the value of the resonance frequency.

6. A discharge lamp operating apparatus, comprising:
   first and second switches connected in series at a first node;
   third and fourth switches connected in series at a second node, and in parallel with said series-connected first and second switches, wherein said first and fourth switches define a first switch group and said second and third switches define a second switch group;
   a transformer having a primary winding and a secondary winding;
   a first capacitor electrically connected in series with said primary winding between said first and second nodes;
   a closed loop circuit including a discharge lamp, a second capacitor and the secondary winding of said transformer; and
   current detecting means for detecting when an absolute value of an alternating current flowing through at least one of siad first, second, third and fourth switches reaches a substantially zero-crossing point and, responsive to such a detection, for closing one of said first switch group and said second switch group and for opening the other of said first switch group and said second switch group.

7. A discharge lamp operating apparatus according to claim 6, further comprising first, second, third and fourth rectifiers respectively connected in parallel with each of said first, second, third and fourth switches.

8. A discharge lamp operating apparatus according to claim 6, further comprising third, fourth, fifth and sixth capacitors connected in parallel with said first, second, third and fourth switches, respectively.

* * * * *